United States Patent
Srinivasan

(10) Patent No.: US 7,289,485 B1
(45) Date of Patent: Oct. 30, 2007

(54) COMMUNICATIONS SYSTEM FOR DELIVERING IP TELEPHONY AND WEB BASED INFORMATION

(75) Inventor: Thiru Srinivasan, Highland Ranch, CO (US)

(73) Assignee: U.S. West, Inc, Englewood, CO (US)

( * ) Notice: Subject to any disclaimer, the term of this patent is extended or adjusted under 35 U.S.C. 154(b) by 0 days.

(21) Appl. No.: 09/145,680

(22) Filed: Sep. 2, 1998

(51) Int. Cl.
H04L 12/66 (2006.01)

(52) U.S. Cl. ....................... 370/351; 709/203
(58) Field of Classification Search ........... 370/270, 370/351–356; 709/201, 202, 203, 217, 317
See application file for complete search history.

(56) References Cited

U.S. PATENT DOCUMENTS

| | | | | |
|---|---|---|---|---|
| 5,838,682 A | * | 11/1998 | Dekelbaum et al. | 370/401 |
| 5,907,547 A | * | 5/1999 | Foladare et al. | 370/352 |
| 6,130,933 A | * | 10/2000 | Miloslavsky | 379/90.01 |
| 6,192,050 B1 | * | 2/2001 | Stovall | 370/389 |
| 6,192,403 B1 | * | 2/2001 | Jong et al. | 709/224 |
| 6,256,620 B1 | * | 7/2001 | Jawahar et al. | 707/2 |
| 6,278,704 B1 | * | 8/2001 | Creamer et al. | 370/352 |
| 6,337,858 B1 | * | 1/2002 | Petty et al. | 370/356 |
| 6,385,191 B1 | * | 5/2002 | Coffman et al. | 370/352 |
| 6,385,646 B1 | * | 5/2002 | Brown et al. | 709/217 |
| 6,449,260 B1 | * | 9/2002 | Sassin et al. | 370/270 |
| 6,493,447 B1 | * | 12/2002 | Goss et al. | 379/265.09 |

OTHER PUBLICATIONS

The VocalTec Telephony Surf & Call Gateway; Jun. 25, 1998; http://www.vocaltec.com/products/gtw/gtw_sc_intro.html.

Push Media; by David Strom; Jun. 25, 1998; http://www.webreview.com/96/12/13/feature/index.html.
Microsoft NetMeeting; Apr. 24, 1998; wysiwyg://36/http://www.microsoft.com/netmeeting/reskit/nmrk21ch1.html.

* cited by examiner

Primary Examiner—Huy D. Vu
Assistant Examiner—Duc Duong
(74) Attorney, Agent, or Firm—Robert G. Crouch; Gregory T. Fettig; Marsh Fishmann & Breyfogle, LLP

(57) ABSTRACT

A system that provides real-time communications over a data network, such as the worldwide web, between a system user who has accessed a Party's web page and a service agent employed by the Party. Functionality is provided via executable software associated with the web page such that when an icon on the web page is selected, a mode of communication is established. This mode may be IP telephony over the world wide web. In addition to the establishment of real-time audio communications, functionality is provided which translates the web page(s) which the system user is viewing or viewed already into HTML language which is transmitted as an E-mail and stored in a database until the phone call is assigned to a service agent. Included with the E-mail is identification information for the system user. Once a telephone call is assigned to a service agent, the E-mail memory is searched and the particular E-mail relating to the system user. The HTML language is then translated and the web page(s) is reconstructed, including all hidden hypertext links, I.P. address, cookies, login ID, password, Java applets, and any hidden HTML tags. The web page(s) is then pushed (using PUSH technology) to the service agent at the same time the telephone call is answered. The service agent is now able to view the same page the system user is viewing or viewed already and thus provide improved information and instruction.

2 Claims, 5 Drawing Sheets

WEB PAGE

COMMUNICATIONS SYSTEM FOR DELIVERING IP TELEPHONY AND WEB BASED INFORMATION

FIELD OF THE INVENTION

The present invention relates to a communications system through which a network user may communicate remotely with another system user, and more specifically to a system which provides for the simultaneous transmission of IP telephony and alpha numeric information.

BACKGROUND OF THE INVENTION

In recent times the worldwide web has become a very popular place for carrying out commerce. Merchants of goods currently have web pages which may be accessed by Internet users in order to browse through descriptions and pictures of the different products which are for sale. In order to view this information, a system user must know or have access to the IP address for the merchant's web page(s). The situation may arise when prospective customers while accessing the merchant's web page(s), may seek more information or help than is currently being provided on the page. This additional information may relate to the potential purchase of a product, support for a product which has already been purchased, as well as any other general inquiries about the products themselves. In the past, one way for the potential customer to reach the merchant was to transmit an E-mail over the web page. Icons could be included on the web page(s) for the system user to select and then type in text for a message. The potential customer would then send the message and wait for a response. The drawback of this particular mode of communication is that any answers which were to be returned from the merchant would take at least as long as it takes to transmit an E-mail, type a return message, and then send it back. In the worst-case scenario, the merchant would only answer its E-mail on a periodic basis thus requiring the customer to wait extended periods of time for a reply.

Technology does currently exist for providing at least one form of real-time contact and nearly instantaneous feedback through the worldwide web. Software and hardware can be installed on a system user's personal computer which provides a telephonic connection over the worldwide web. The system user's computer must be equipped with speakers and a microphone as well as software which processes voice information. The receiving party must also have the same sort of equipment in order to receive and transmit this type of voice communication.

Software also currently exists for including an icon on a web page(s) which would allow a user, through execution of a plug-in within the web browser, to establish a telephonic connection with a service agent for the merchant. As was described above, the potential customer's personal computer must be equipped with a microphone, speakers as well as voice processing software. The server on which the merchant's web page is located must have functionality to process this type of information and establish the connection with the service agent. One example of a plug-in which will perform this type of function is the Surf&Call software. This type of communication can be established from computer to phone or computer to computer if both computers are equipped with the right software and hardware.

SUMMARY OF THE INVENTION

Described herein is a system for providing communication between parties over a data network such as the world-wide web. In one aspect of the invention, audio communication is provided between two parties simultaneously with the transfer of alpha-numeric data. A system user at a remote site may access a data network such as the worldwide web. A server may include web pages which may contain information about a business or a product. A system user may access these web pages to view the information. As the system user is viewing the pages, the need may arise where additional information would be helpful and this information is not necessarily provided anywhere on the web site. In this case, the best solution may be to talk to a human service agent.

According to the present invention, the web page(s) may include functionality which the system user may employ to establish audio communication with a service agent. By selecting an icon or other device on the web page, communications software, such as IP telephony, may be activated in the system user's computer as well as on the server which begins the process of establishing an telephonic connection. In one aspect of the invention, a telephone system is connected to the server which receives the telephonic communications off the data network and provides them to the service agent. A telephone system may be a PBX phone system in which, as telephone calls are received, they are placed in a queue and as soon as an agent becomes available, a connection is established to that agent.

The server, in order to improve communications between the system user and agent, may include means for sending a copy or some sort of construction of the web page(s) to the agent. In one aspect of the invention, the system user is provided with the functionality to convert a web page to HTML language and send this information as an E-mail to the server along with the telephone call. Also included with the E-mail may be identification information for the system user. When an agent becomes available to receive a phone call waiting in a queue of the PBX phone system, the call is assigned, and at the same time the E-mails stored in the server are scanned to locate the identification information for the system user. Once the E-mail has been located, the E-mail is delivered to the agent's user interface after the web page is reconstructed from the HTML language. The web page may still include all the hypertext links. Once the web page has been reconstructed, it is then pushed to the user interface for the service agent. Nearly simultaneously, the service agent receives the phone call from the PBX phone system and is able to speak with the system user while viewing the same web page the system user is viewing. With all the functionality included in the reconstructed web page, the service agent may move through the websites with the system user.

DESCRIPTION OF THE PREFERRED EMBODIMENT

Figure 1:
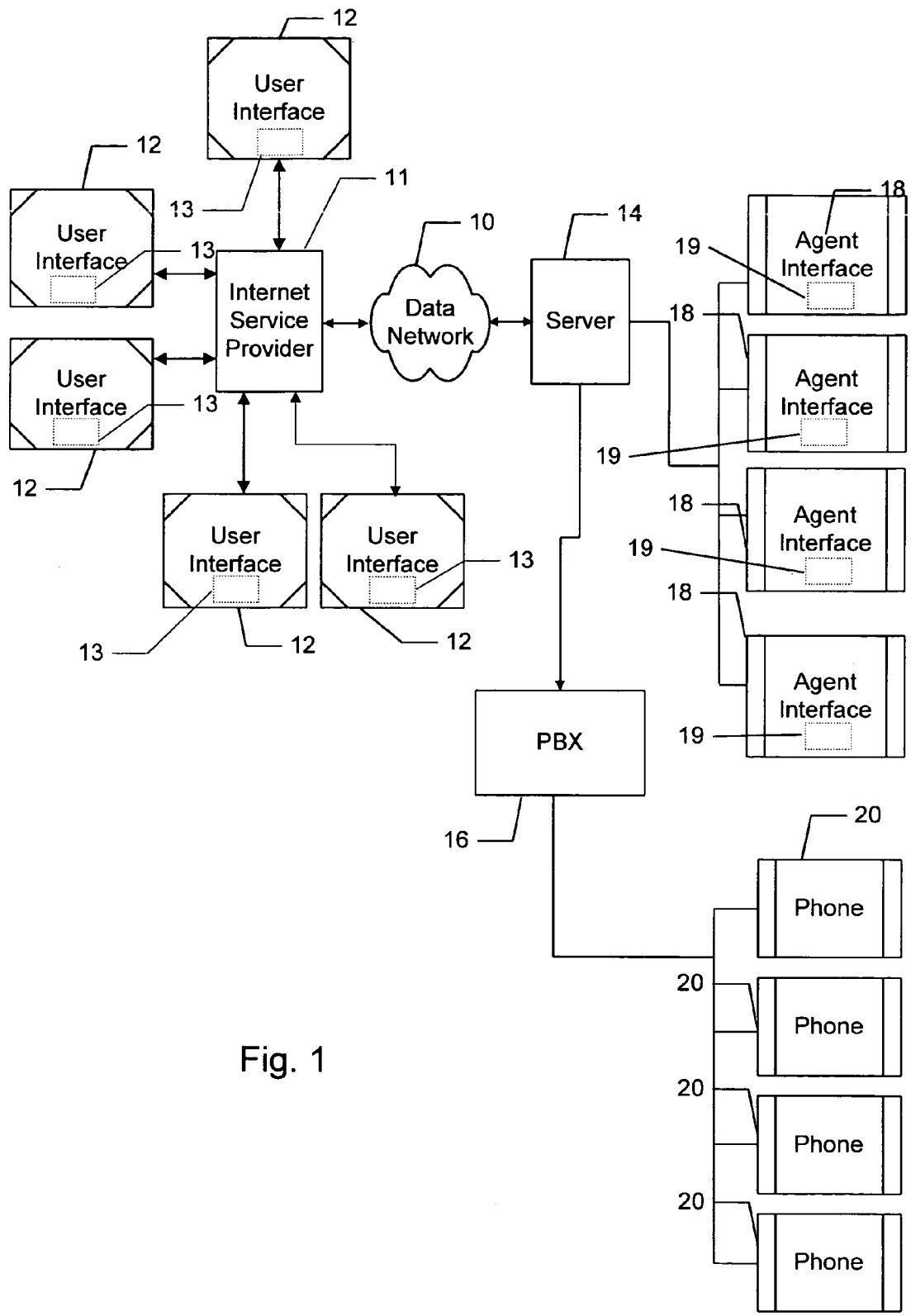
FIG. 1 discloses a data network in which the present invention is incorporated.

Disclosed in FIG. 1 is a network system which may incorporate the invention described herein. As is well known in the art today, access to many types of information is available over data networks such as the worldwide web. Remotely located users establish a connection with the data network and then move to different locations throughout the network to access information. One mode of connection to the data network is shown in FIG. 1. System users who wish to establish a connection with the data network employ a user interface 12 to first establish a connection with an Internet service providers (ISP) 11. In one aspect of the invention, the interface 12 for the system user is a personal computer which has a modem incorporated therein. Through this modem, the system user establishes a telephonic connection to a server provided by the ISP 11. Once a connection is established the ISP server provides access to the data network 10. In order to move to different locations on the data network, each user interface is equipped with a web browser. For purposes of the invention described herein the system user's web browser includes a HTML converter plug-in 13 which converts a web page currently being viewed by the system user into an E-mail which includes one or more HTML pages. The plug-in 13 will be described in greater detail below.

A data network such as the worldwide web is made up of a number of nodes. These nodes are usually servers on which various types of information may be posted in the form of a web page. Shown in FIG. 1 is server 14 which acts as a node in data network 10. In the invention described herein, the server 14 may contain content in the form of a web page(s) from a merchant or other business which is advertising its products.

The number of companies performing commerce on the worldwide web has increased in recent times. In most cases, the merchants will provide websites on different servers which customers may access and view information about products the merchant is selling. Because of the vast array of images and other information that are possible to display on a website, system users may find out just about anything they need to know about a product. However, there may be situations where certain information is not provided, a system user wishes to have information explained in greater detail, or a system user wishes to find information about repair or other services available for the product. In the invention described herein, a website may be enhanced such that a system user may contact a service agent of the merchant and carry on a conversation. Functionality is also provided to transmit information to the service agent about the web page(s) the system user is currently viewing in order to expedite the entire process.

Referring again to FIG. 1, a merchant's system for handling inquiries received over the web is also shown. It is known that merchants will provide a number of service agents who man telephones in order to answer questions from prospective customers. The telephones 20 for the service agents to answer calls are connected to server 14 through PBX phone system 16. A PBX phone system operates in a manner such that when telephone calls are received by the merchant, they are placed in a queue. When service agents become available, the PBX phone system will connect the prospective customer with the service agent who has just become available. The system shown in FIG. 1 is further enhanced by a series of user interfaces 18 which are connected through server 14. These user interfaces provide the service agents with a connection to the worldwide web. The user interfaces for the service agents include web browsers for accessing web sites on the data network. Each user interface also includes a web browser plug-in 19, which provides for the viewing of web pages which have been transmitted to the service agent's interface using PUSH technology.

Figure 2:
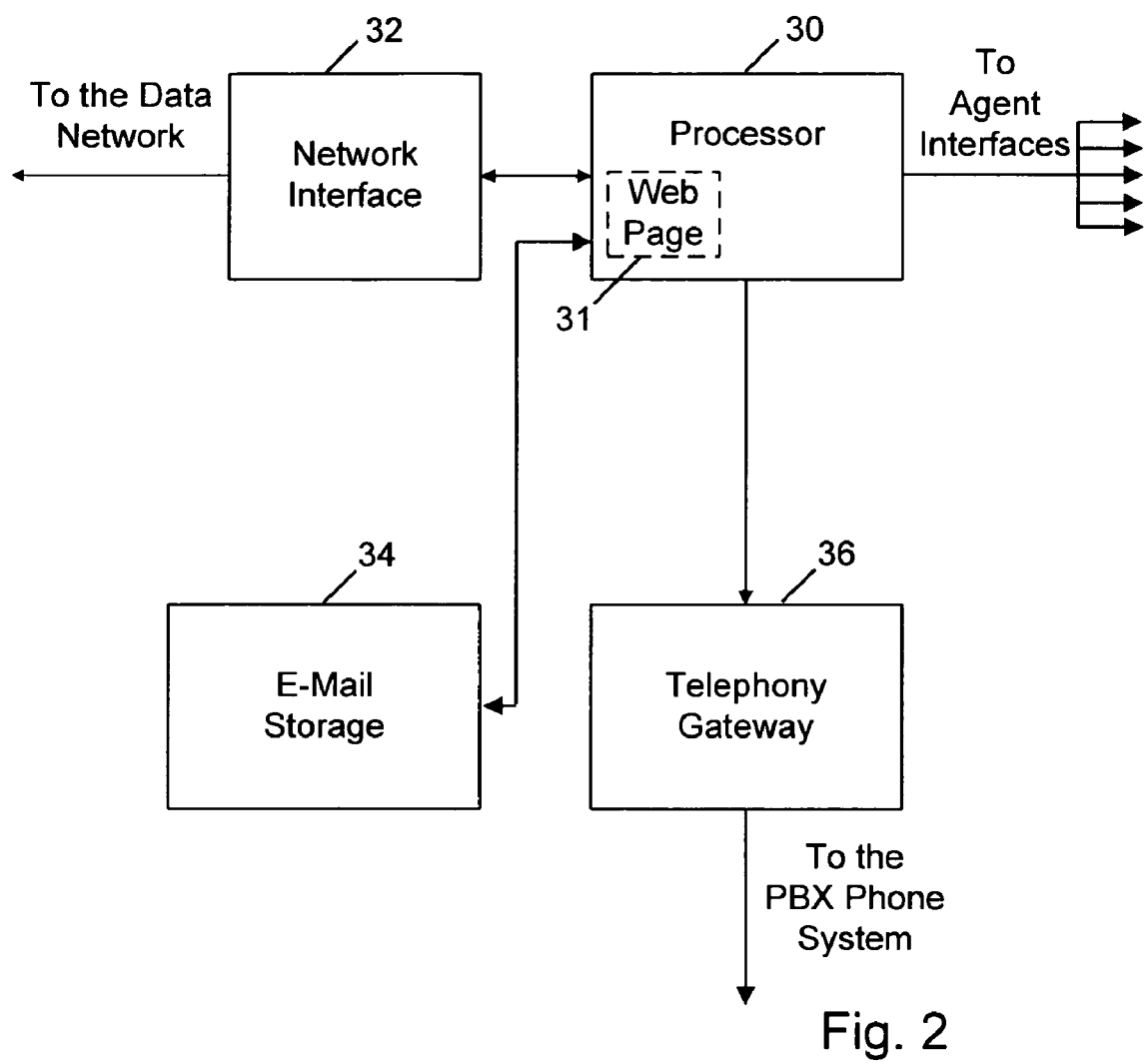
FIG. 2 discloses a system diagram for the server.

The server 14 performs the majority of the processing for the present invention. The server will process information provided by the system users over the data network, and provide this to the service agents. Disclosed in FIG. 2 is an internal system diagram for the server 14. All communications which are received and transmitted from the worldwide web are processed through network interface 32. The transmission and receipt of information through the interface is controlled by processor 30. The processor 30 controls all the internal functions of the server 14. Incorporated into the processor 30 is web page or pages 31. These web pages are created by the merchant or other parties providing information, and are displayed to system users who contact the website. Also in contact with processor 30 is E-mail storage 34, which is a memory for storing all electronic mail received by the server.

Connections also incorporated into server 14 are the various electronic components employed by the service agents. Telephone gateway 36 provides an interface between the PBX phone system 16 and processor 30. This gateway provides all the necessary conversion functionality for establishing communication through IP telephony. Finally, a connection is established from processor 30, to the user interfaces for the service agents. Through this connection, the service agents have access to E-mail stored in memory 34 as well as to the data network.

As was described above, functionality is provided on the website for those viewing the information to establish a real-time audio connection with a service agent. This connection can be established through executable software which is activated through selection of an icon which appears on the web pages. In the preferred embodiment of the invention, this audio communication is established through use of IP telephony. IP telephony provides for establishing connections over the data network through hardware and software incorporated into the system user's network interface as well as software included in the server. The hardware which may be included on the system user's interface are a microphone and speakers. Software incorporated into the user interface and the server provides the functionality of converting audio information into digital information for transmission over the data network, and vice versa. In order to establish an audio connection from the web page(s), the selection of the icon executes software which dials a specific address or phone number, which in the example provided herein, is the telephonic gateway 36 that is incorporated into the server.

Figure 4:
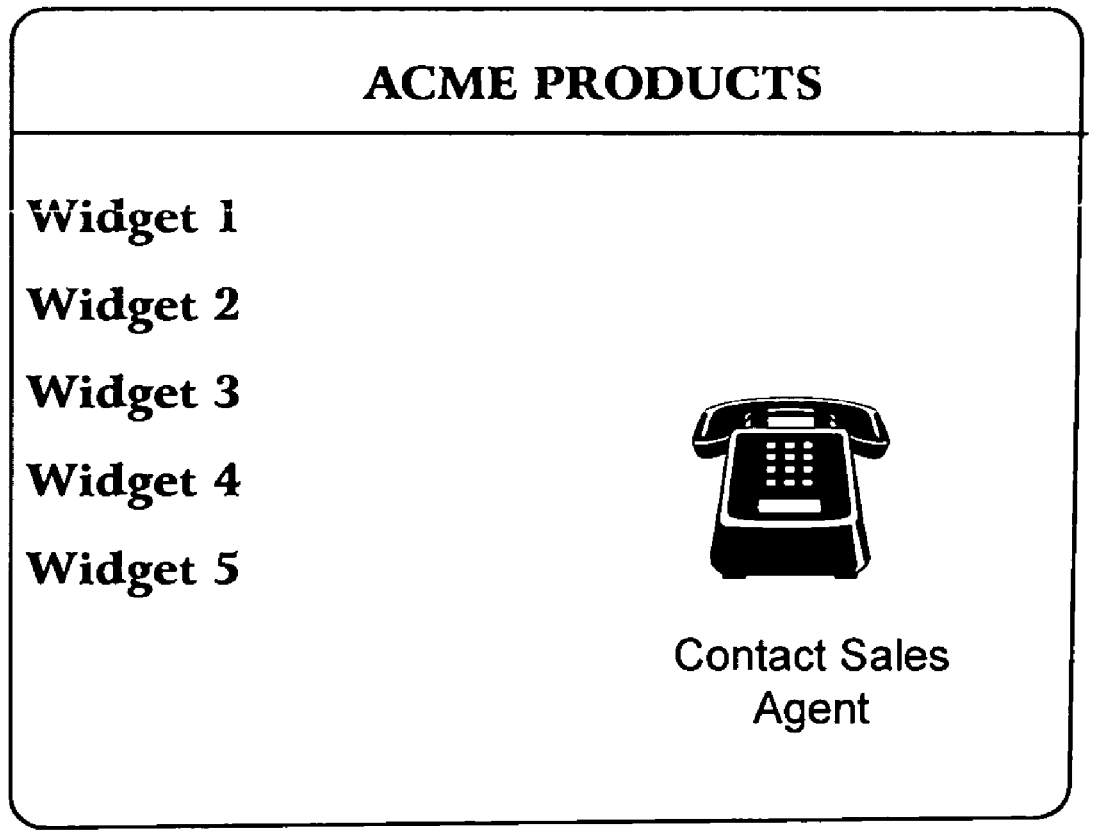
FIG. 4 discloses an example of a web page which the system user may view when accessing the server.

Disclosed in FIG. 4 is an example of a web page which a system user may view when accessing the merchant's website. As can be seen, there is a description of the merchant, a listing of products for purchase, as well as an icon for establishing communication with a service agent. The system user merely needs to select the icon with the computer mouse and through the hardware and executable software incorporated into the server, an IP telephony connection is established. In the preferred embodiment of the invention, the destination is the PBX phone system of the merchant. When this telephone connection is received by the PBX phone system connected to the server, it is placed in a queue of received telephone calls. When an agent becomes available, the call is then sent to an available agent.

In order to expedite the process of the service agent providing help to the prospective customer, additional functionality is activated when the system user selects the communications icon. The present invention provides to the service agent a reconstructed version of the web pages which the system user is currently viewing and has used to contact the merchant. Also provided to the service agent are the web pages from all of the URL's visited by the system user under the control of the server. The web page(s) provided to the service agent is not an inactive copy, but instead a fully functional interactive web page which includes all hypertext links (as well as I.P. address, cookies, log-in I.D., password, Java applets, and any hidden HTML tags) such that the service agent may direct the system user forwards and backwards through a number of web pages and is able to follow along so that both the service agent and the system user are viewing the same web pages.

When a system user selects the communications icon, the plug-in 13 incorporated in the system user's web browser is activated which converts the entire web page currently being viewed as well as any web pages which were viewed in that domain to HTML language. This data is stored in an E-mail message which is transmitted to E-mail memory 34. The structure for this E-mail message is shown in detail in FIG. 5. As is seen, the E-mail message is made up of a plurality of segments of information relating to the web page the system user is viewing, as well as the other web pages the system user has viewed in the same domain. In the first segment, a header 50 is provided which is the length of the Caller ID in bytes. The second segment 52 is the Caller ID itself. The rest of the segments included in the E-mail message contain information relating to the web pages which the system user has viewed. In segments 54 and 56 the length of the page being currently viewed is provided as well as the page in HTML language. In segments 58 and 60 the length of the page previously view is provided as well as that page in HTML language. Information about the page viewed before that, is provided in segments 62 and 64. The E-mail message may be as large as necessary to include information about the pages viewed by the system user under control of the server.

Figure 5:
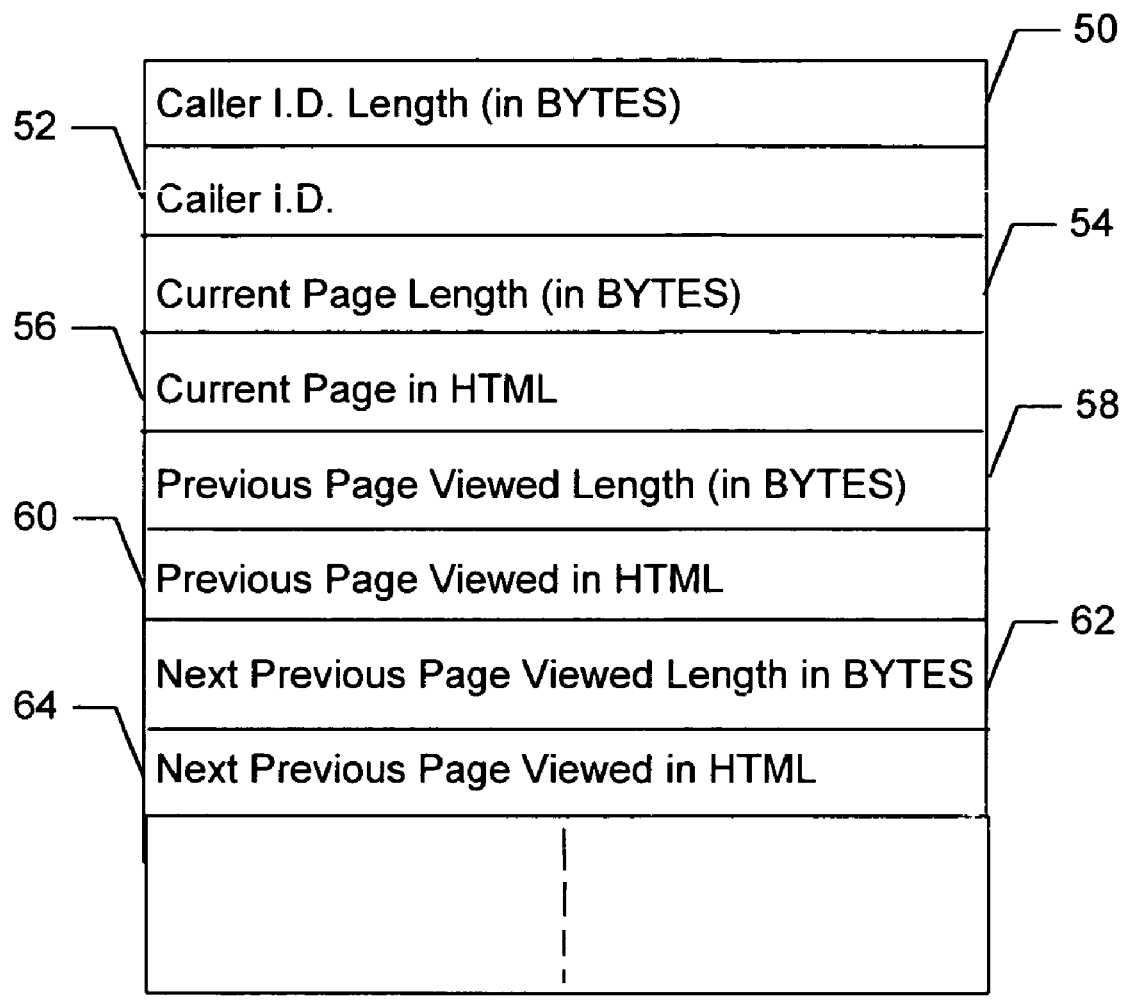
FIG. 5 discloses the structure of the E-mail message which include the Caller ID and the converted web pages.

As is seen in FIG. 5, the Caller ID for the system user is also included in the E-mail message. This identification information may be the telephone number from which the system user is calling via a modem, a caller ID assigned by a system administrator, or an ID a user assigns to himself. The only requirement for the ID is that it be unique. The procedure for translating the web page(s) and storing it in an E-mail message is done simultaneously with the establishment of the telephony communication between the system user and the PBX phone system.

As was described above, the PBX phone system holds the system user calls in a queue until a service agent becomes free. When an agent becomes free the call is assigned to that agent. At the time the call is assigned, the processor reads the caller ID from the call and performs a search of the E-mail messages to find a match. When a match is found the E-mail message is accessed and using functionality incorporated into the server, the server reconstructs all the web pages contained in the message including the hypertext links, I.P. address, cookies, log-in I.D., password, Java applets, and any hidden HTML tags from the web pages. Once reconstruction is complete, PUSH technology incorporated into the server provides all the web pages to the service agent. The service agent is now in telephonic communications with the system user and is viewing an identical web page. The parties may now move through the web pages together during their telephonic discussions.

Figure 3:
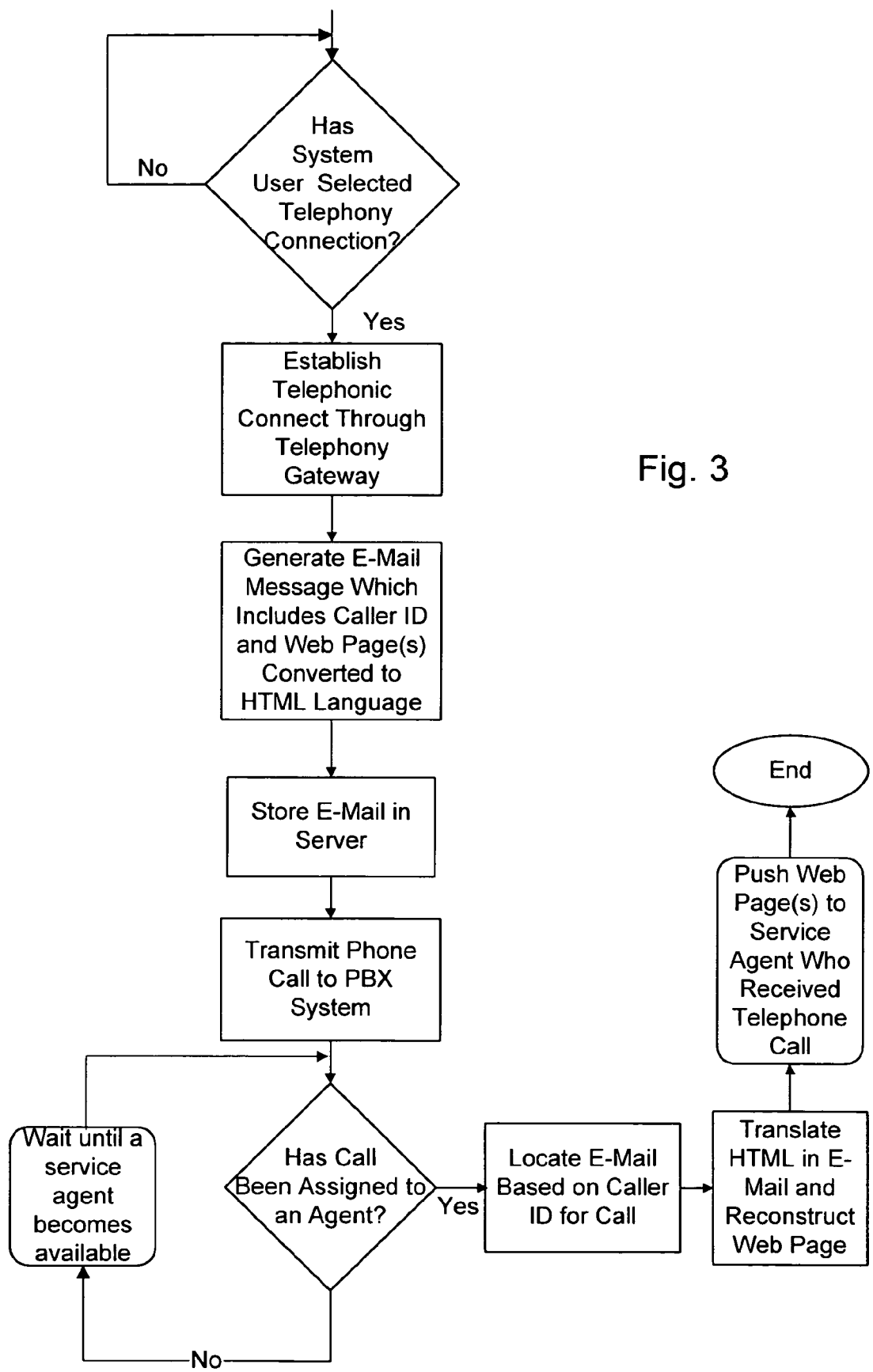
FIG. 3 is a flow chart which describes the operation of the server.

Disclosed in FIG. 3 is a flow chart which describes in detail the operation of the system described herein. As was described previously, the data network may be accessed by either a dial-up connection to an Internet service provider or by using an interface connected to a LAN that has access to the data network via a proxy server. Upon installation of the plug-in on a client machine, the customer will be requested to input the telephone number (caller ID). If the system user is connected through a LAN, then a unique but fictitious, telephone number (caller ID) will be assigned to each of the user interfaces. The system user would then program the plug-in with such fictitious telephone numbers when the plug-in is installed.

The merchant's web master will program the communication icon with the telephone number to be dialed when the system user selects the icon along with an E-mail address of the call center. It is assumed that the time period used in the time-out mechanism to disconnect the session at the server side would be sufficient for the call to be answered by a call center agent. When the customer selects the icon, the plug-in will generate a message which includes caller ID and the entire web page being viewed on the system user's interface, as well as all web pages viewed by the system user in the same domain. The message will also include all hypertext links, I.P. address, cookies, log-in I.D., password, Java applets, and any hidden HTML tags from the web pages. This message is then transmitted as an E-mail to the website. This action invokes the communication icon's executable code which places a telephone call over the data network with the caller ID via the Internet telephone gateway provided by the ISP to the call center in addition to sending an urgent E-mail message (to the programmed E-mail address behind the communications icon) containing the caller ID and the web page(s) in HTML language. The delivery of the web page(s) is coordinated with that of the call in the following manner. Assuming that the service agents are on a PBX system, the call enters a queue, forcing the customer to potentially listen to on-hold music. In the meantime, the E-mail sent by the ISP has arrived at the call center's service mailbox 34. The server is configured with each of the agents' extensions and the corresponding IP address of the desktop. When the PBX is ready to deliver the call to an agent, it sends a message to the server with the caller ID and the agent's extension. A program on the server then looks up the mailbox, scans for a match of a caller ID in the E-mail message that it received from the system user's browser plug-in 13. Once a match is found, the program creates an HTML page from the web page information contained in the E-mail and using the PUSH technology, displays the current page on the service agent's web browser via the web browser plug-in 19. The plug-in 19 stores the remaining web page(s) in memory to help the service agent move forward and backward later. The program then informs the PBX of the PUSH action, triggering the PBX to complete the call to the service agent. Once the connection is established, both the customer and the service agent can navigate the website together. Of course, between the time the customer clicked on the communications icon and the web page(s) delivery to the service agent, the customer may visit other websites of interest. Nevertheless, a system user may return to the same web page by clicking on the back button of the browser once the service agent has come online.

The foregoing description of the present invention has been presented for purposes of illustration and description.

Furthermore, the description is not intended to limit the invention to the form disclosed herein. Consequently, variations and modifications commensurate with the above teaching, and the skill or knowledge of the relevant art, are within the scope of the present invention. The embodiments described hereinabove are further intended to explain best modes known for practicing the invention and to enable others skilled in the art to utilize the invention in such or other embodiments and with various modifications required by the particular applications or uses of the present invention. It is intended that the claims be construed to include alternative embodiments to the extent permitted by the prior art.

What is claimed is:

1. A communication system comprising:
    data network containing information which is accessible by system users in connection with the data network;
    a server in connection with the data network comprising:
    a website accessible by the system users over the data network, where the web page includes an audio communications interface for establishing an audio connection between the system user and an available service agent; and
    a processor which processes the audio communication between the system user and the service agent, and receives and stores in memory a version of at least one web page from the website which the system user has viewed, wherein the at least one web page includes a web page which the system user is currently viewing as well as any web pages which the system user has previously viewed in a particular domain;
    a telephone system which receives the audio communication from the processor and assigns it to the service agent; and
    a service agent interface, which upon assignment of the audio communications to the service agent, receives a broadcasted, interactive version of the at least one web page from the processor;
    wherein user interfaces which the system users employ to connect with the data network include a system user web browser plug-in which converts the at least one web page to HTML language;
    wherein the system user web browser includes sending the converted at least one web page in an E-mail message to the processor which includes a Caller ID for the system user and at least one of: hypertext links, I.P. address, cookies, log-in I.D., password, Java applets, and any hidden HTML tags, along with the text and information for each of the web pages visited by the system user under the domain;
    wherein the E-mail message includes a plurality of information segments wherein the information segments include:
    a length in bytes for the Caller ID;
    the Caller ID in HTML;
    a length in bytes for each of the at least one web page; and
    the converted at least one web page.

2. An apparatus for providing communication between a system user with access to a data network and an available service agent, comprising:
    a server connected to the data network, wherein the server comprises:
    a website which is accessible by the system user and includes icons which when selected by the system user initiate a process for establishing audio communications with the available service agent; and
    a processor that provides a connection for the audio communication to a remotely located telephone system and stores a converted version of a web page currently being viewed and any web pages previously viewed in a particular domain by the system user in memory; and upon establishment of the audio communication to the available service agent, reconstructs and broadcasts the web pages in the memory to a service agent interface associated with the available service agent;
    wherein user interfaces which the system users employ to connect with the data network include a system user web browser plug-in which converts the web page being viewed and web pages previously viewed by the system user to HTML language;
    wherein the system user web browser includes an ID for the system users in the converted web pages in a message to the processor and at least one of: hypertext links, I.P. address, cookies, log-in I.D., password, Java applets, and any hidden HTML tags, along with the listed information for each of the web pages visited by the system user under the domain;
    wherein the message includes a plurality of information segments wherein the information segments include:
    a length in bytes for the Caller ID;
    the Caller ID in HTML;
    a length in bytes for each of the at least one web page; and
    the converted at least one web page.

* * * * *